INVENTOR
C. I. BOSKET
BY
ATTORNEY

June 6, 1950     C. I. BOSKET     2,510,544
TOOLHOLDER
Filed May 23, 1946     2 Sheets-Sheet 2
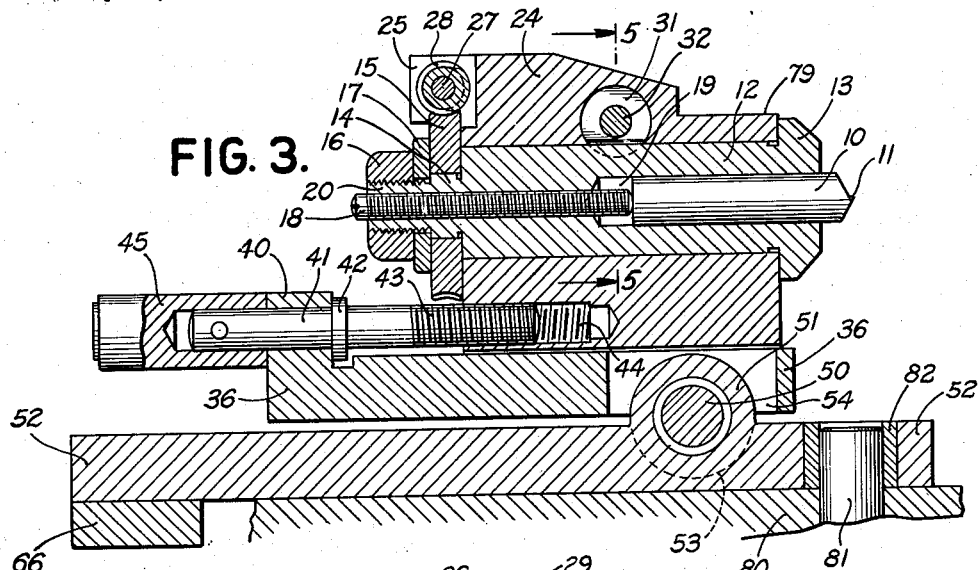
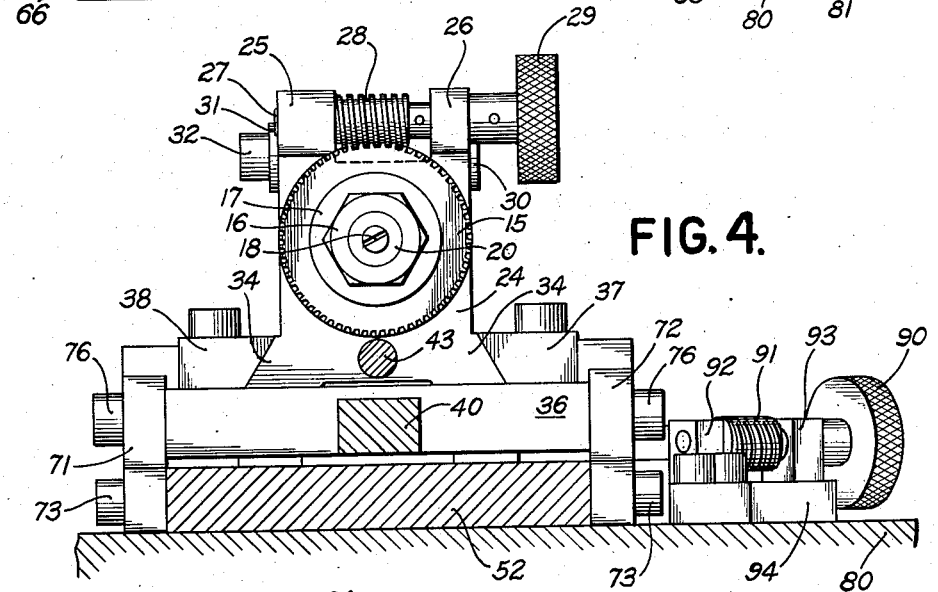
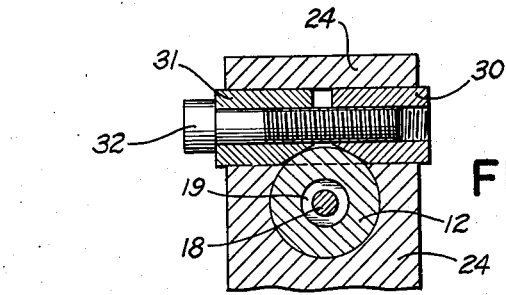
INVENTOR
C. I. BOSKET
BY
ATTORNEY Patented June 6, 1950

2,510,544

UNITED STATES PATENT OFFICE 2,510,544

TOOLHOLDER

Chester I. Bosket, Union, N. Y., assignor to International Business Machines Corporation, New York, N. Y., a corporation of New York Application May 23, 1946, Serial No. 671,857

2 Claims. (Cl. 82—36)

1

This invention relates to improvements in devices for holding cutting tools and more specifically to a tool holder with a series of relatively adjustable supports for varying the setting of a diamond edged cutter for minute angular and linear adjustments.

In the finishing of metallic cylinders or rolls for use as rotogravure electros, it is necessary to prepare the cylindrical surface with a smooth finish. Not only is the surface finish of a critical nature but the outside diameter of such rolls must be held to close tolerances. The roll is turned down with a rough cut and a finishing cut is taken by the diamond tipped tool moved parallel to the axis of the roll but at a fixed radial distance. It was found that changes in setting of the diamond pointed tool were difficult to make to secure a better cutting angle and changes in outside diameter of the work piece. Heretofore, it was required that the cutter be adjusted by hand and hours were sometimes required to obtain the proper adjustment of the tool.

An object of the invention is to provide a tool holder with adjustment devices for making minute changes in the axial and angular relation of the tool with respect to the holder.

Another object of the invention is to form the body of a tool holding frame of a number of relatively movable parts to secure as many as five different linear, axial and angular changes in the position of the cutting point of the tool.

Another object of the invention is the provision of a tool holding frame having vertical and horizontal pivots for swinging the cutting edge in finely controlled arcs opposite the work piece.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 3 is a sectional elevation view taken along lines 3—3 in Fig. 1.

Fig. 4 is an end elevation view partly in section taken along lines 4—4 in Fig. 2.

Fig. 5 is a detail section view taken along lines 5—5 in Fig. 3.

Figure 1:
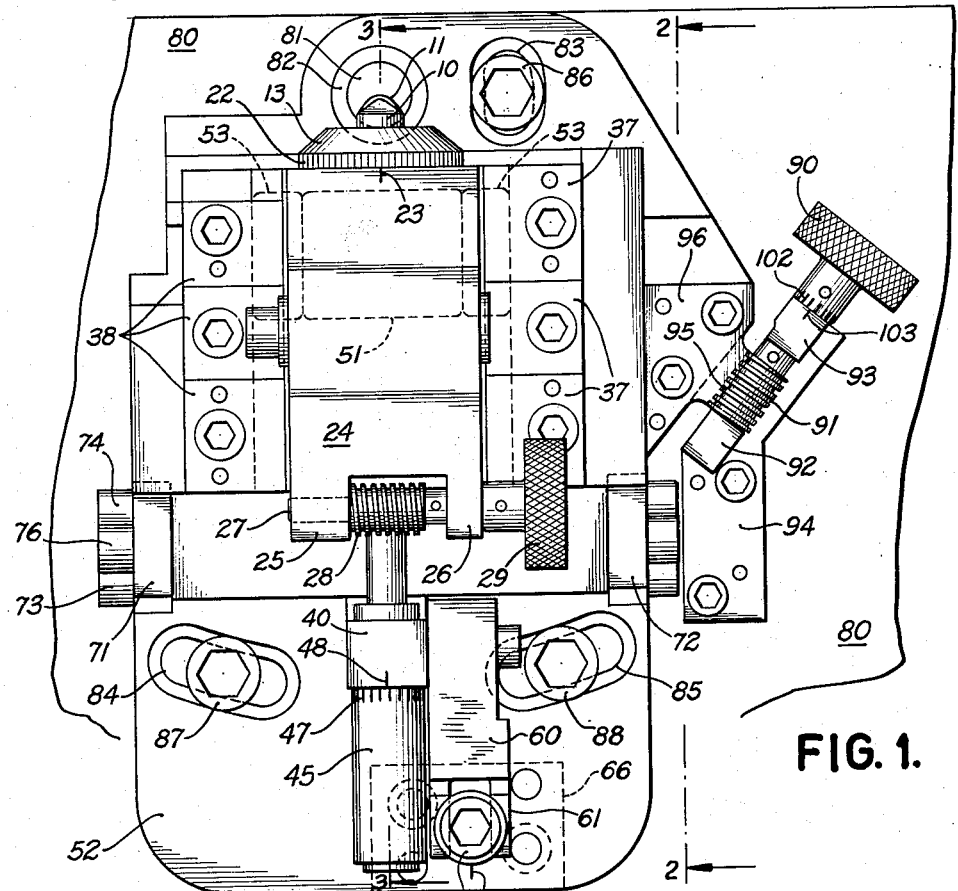
Fig. 1 is a plan view of the tool holder device.

The cutting tool 10 is shown in Fig. 3 as a cylindrical member having a diamond tip 11 secured to the right end of the tool and arranged

2 with cutting surfaces at the proper angle for cooperation with a work piece assembly on a machine tool such as a lathe. This tip 11 could be formed of some other hard material such as carboloy or tungsten steel to form a cutting edge. The tool is seen to be assembled in a cylindrical tool holder 12 having an enlarged head or flange 13 through which the tool 10 projects. The rear end of cylinder 12 is formed with a shoulder 14 which is notched with a key way so that a worm gear 15 can be assembled thereon. The left end of cylinder 12 is threaded on extension 20 so that the nut 16 may be pressed against a washer 17 to hold the worm gear 15 on the cylinder.

Figure 2:
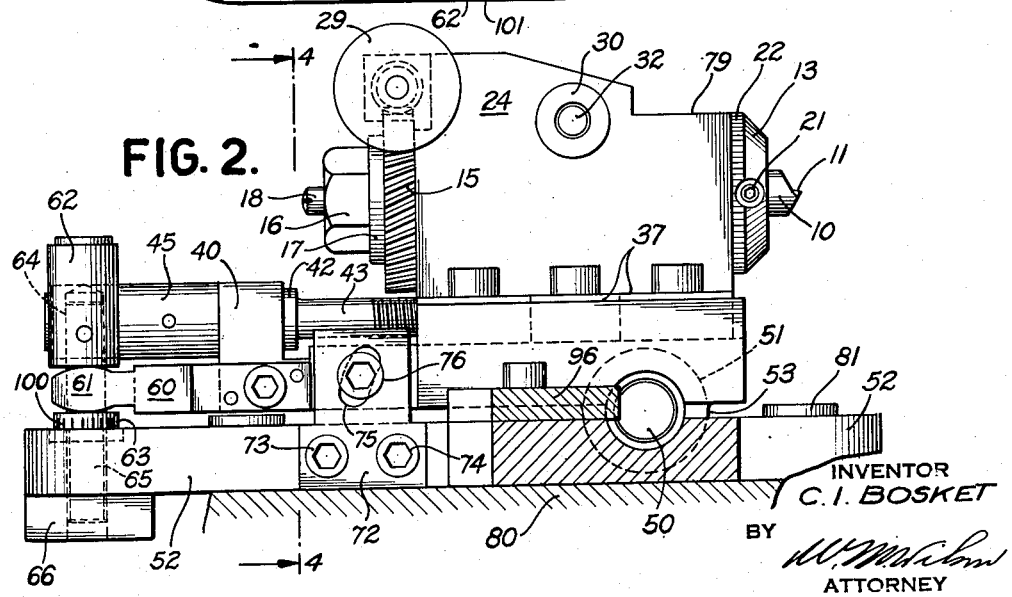
Fig. 2 is a side elevation view of the tool holder partly in a section taken along lines 2—2 in Fig. 1.

Through the center of cylinder 12 there extends an elongated screw 18, the inner end of which abuts against the left end of the tool 10 within the cylindrical opening 19 cut to receive tool 10. Cylinder 12 is threaded to receive screw 18 and the outer end of the screw is notched so that it may be engaged for rotation to adjust the tool position axially for relatively coarse settings which are refined by other linear adjusting means to be described hereinafter. In Fig. 2, it is seen that a set screw 21 extends through the enlarged flange 13 of the cylinder for holding tool 10 relative to the cylinder 12.

In Fig. 2 it is also noted that the outer periphery of the flange 13 is scribed with a series of adjustment control lines for indicating and regulating the extent of angular adjustment of the cylindrical tool holder. These lines 22 are associated with a single line 23 (Fig. 1) marked on a platform 19 of a tool slide block 24 holding the cylinder 12 and with reference to which the cylinder is given angular adjustment through the worm gear 15.

As shown in Fig. 1, one end of the slide block 24 is formed with a pair of extending bearing arms 25, 26 through which there extends a rod 27 carrying a worm wheel 28 fixed thereon within the opening formed between the arms. Attached to rod 27 outside arm 26 is a knurled finger piece 29 for rotating the worm 28 to change the position of the cooperating worm wheel 15 (Fig. 3) and the attached cylindrical tool holder 12. The extent of adjustment varied by movement of knob 29 is observed by noting the change in relationship between the fixed line 23 and the adjustment lines 22 provided on the periphery of the flange 13 of the rotatable holder.

When the desired degree of adjustment is obtained, the cylindrical holder 12 is clamped in position by means of the devices shown in Fig. 5. There it is seen that the block 24 is formed with a horizontal cylindrical opening directly above the opening provided for holder 12 and at right angles thereto. Within this horizontal opening, there is fitted a pair of wedges 30 and 31, the former being threaded to receive a clamping bolt 32 and the latter formed with a hole through which the bolt extends. Previous to the use of the worm gear arrangement for adjustment, bolt 32 is loosened, and after the proper setting is made, this bolt is again tightened to draw the two wedge pieces together to force the cylinder 12 downward so that it is clamped in the adjusted position.

It is noted from the foregoing portion of the description that the tool 10 is the receiver of linear adjustment by means of screw 18 and angular adjustment by rotation of worm wheel 15 and cylinder 12. A third adjustment is made possible by the sliding arrangement of block 24 with respect to its support.

Reference to Fig. 4 shows that the lower part of block 24 is formed with a pair of dove tail feet 34 and 35 fitting under gibs for holding the block on the top of a hinged platform 36. Fastened to the top of platform 36 is a series of six gibs 37 and 38. As shown in Fig. 1 three gibs 37 extend along the right side of block 24 and three other gibs 38 extend along the left side of the block 24 to cooperate with the angular surfaces of the dove tail portions and thereby hold the block on the platform but arrange it to be free thereon for linear movement back and forth.

Referring to Fig. 3, it is noted that platform 36 is formed with a raised projection 40 through which there extends a rod 41 with a shoulder 42 contacting against one side of raised portion 40. Extending from rod 41 is a threaded portion 43 engaging in a tapped opening 44 formed in the lower section of block 24. Attached to the outer end of rod 41 is an adjustment wrench socket collar 45 attached to the rod in such a position as to confine the projection 40 between the two parts 45 and 42.

In Fig. 1, it is shown that collar 45 is provided with a series of gauge lines 47 arranged around the periphery at the end cooperating with the raised projection 40. This projection 40 is provided with a single reference line 48 to provide the fixed reference point for the adjustment secured by the rotation of collar 45. When the collar 45 is turned, the screw portion 43 (Fig. 3) engages the tool slide block and moves it in either direction towards or away from the work piece. This form of linear adjustment is an addition to the similar form of adjustment provided by screw 18, the latter serving to provide coarse adjustments ordinarily used preliminary to the operation of the tool while the secondary fine adjustment is provided by rotation of the screw 43 forming the final adjustments incidental to the actual cutting operation.

It is mentioned hereinbefore that platform 36 is hinged. In Fig. 3 the position of the hinge is noted to be based on the horizontal pivot 50. This pivot 50 extends through a semi-circular projection 51 formed on the top of a swinging base 52 upon which all the tool supporting members are held. Also embracing pivot 50 are a pair of downwardly extending ears 53 formed on the hinged platform. An opening 54 formed in a platform provides clearance for the upwardly extending portion 51, while spaced openings in base 52 provide clearance for the two ears 53.

Adjusting means is provided for swinging the hinged platform 36 up and down on pivot 50.

Attached to the side of projection 40 of platform 36 (Figs. 1 and 2) is a rearwardly extending block 60 formed with a pair of arms 61 confined between an adjustment socket collar 62 and a shoulder 63 fastened to a rod 64 which is threaded and extends down through a tapped portion 65 in a steel plate 66 attached to the bottom of the base 52. When collar 62 is turned for adjustment rod 64 is moved vertically in the tapped portion 65 and carries the arms 61 along therewith to rock platform 36 and the parts carried thereon so that the cutting point 11 of the tool is rocked about the center 50. Scribed lines 100 on shoulder 63 cooperate with line 101 so that the amount of angular adjustment can be gauged. When the desired degree of adjustment up or down is arrived at, the hinged platform is locked in position by means of clamps cooperating with both sides of it.

In Fig. 1, it is seen that base 52 is notched to receive a pair of blocks 71, 72, the latter being shown in Fig. 2 as secured to the side of base 52 by a pair of screws 73 and 74. The upper end of block 72 extends alongside the side of platform 36 and is formed with an arcuate slot 75 through which there projects a clamping screw 76 extending from the side of a hinged platform 36. The slot 75 is formed on an arc taken with reference to the center 50 so that when the screw 76 is loosened, pivotal adjustment may be made by rotation of collar 62 and then the setting may be established by tightening screw 76 in cooperation with block 72 so that the hinged platform is locked in the selected angular position with reference to the base 52.

Another provision for adjusting the point of the tool is found in the swinging arrangement of the supporting base 52. In Fig. 1, it is noted that the lowest supporting member 80, on which the entire tool fixture rests, is provided with a pivot 81 upon which the base 52 is mounted. Base 52 is not only formed with the circular boss 82 for receiving the pivot 81 but it is also formed with a series of three arcuate slots 83, 84 and 85 through which there extends a series of clamping screws 86, 87 and 88. These last mentioned screws are loosened when it is desired to swing the base 52 with reference to the supporting member 80. It is noted that the center pivot 81 is located at or near the cutting edge of the tool and in this way the horizontal angular adjustments have the smallest degree of change as effecting the position of the cutting edge. Adjustment is made by rotation of a knurled knob 90 secured to a worm wheel 91 which is pivoted in two upstanding ears 92, 93 formed on a bracket 94 secured to the supporting member 80. Cooperating with worm wheel 91 is a toothed segment 95 formed on a plate 96 attached to the top of base 52. It is obvious that rotation of knob 90 will cause angular displacement of plate 96 to carry along therewith the attached base 52 so that the base may be rocked to the desired horizontal position and there clamped by tightening the screws 86, 87, and 88.

In order to control and regulate the extent of adjustment provided by the rotation of the knob 90, this knob is provided with adjustment control lines to observe the extent of movement with reference to a fixed line. Knob 90 carries a series of scribed lines 102 moving with reference to a single line 103 marked on the top of ear 93.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A tool holder comprising a sliding block, cylindrical tool receiver mounted in said sliding block, means for clamping said cylindrical holder in said block, a worm gear secured to said cylindrical holder, a worm wheel mounted on said block and cooperating with said worm gear, means for manually adjusting said worm wheel, an adjustment screw threaded in said cylindrical holder cooperating with the tool therein to adjust said tool linearly, a hinged platform upon which said block is slidably supported, a threaded adjustment means for moving said block relative to said platform, a base upon which said platform is hinged with the hinge under the forward portion of the tool block, means for adjusting said platform angularly with respect to said base to swing said cylindrical tool receiver in the vertical plane through its axis, means for clamping said platform in the adjusted position with respect to said base, a supporting member, said base being pivoted upon said supporting member, means for clamping said base to said support member, and means for adjusting said base angularly with respect to said support member comprising a worm wheel attached to a manipulative knob and cooperating with a segment fastened to said base.

2. The invention according to claim 1 in which manipulative means bearing adjustment regulating lines are provided on all of said adjustment means in cooperation with fixed reference lines provided on all relatively fixed opposing means.

CHESTER I. BOSKET.

REFERENCES CITED

The following references are of record in the file of this patent:

UNITED STATES PATENTS

| Number | Name | Date |
|---|---|---|
| 470,010 | Rhodes | Mar. 1, 1892 |
| 550,937 | Bauer | Dec. 10, 1895 |
| 688,800 | Steuer | Dec. 10, 1901 |
| 1,414,970 | Nelson | May 2, 1922 |
| 1,795,594 | Class | Mar. 10, 1931 |
| 2,386,984 | Scott | Oct. 16, 1945 |

FOREIGN PATENTS

| Number | Country | Date |
|---|---|---|
| 115,390 | Great Britain | May 9, 1918 |